United States Patent

[11] 3,634,137

[72] Inventors Goro Akashi;
Yasuyuki Yamada, both of Kanagawa, Japan

[21] Appl. No. 860,780
[22] Filed Sept. 24, 1969
[45] Patented Jan. 11, 1972
[73] Assignee Fuji Photo Film Co., Ltd.
Ashigara-Kamigun, Kanagawa, Japan
[32] Priority Sept. 26, 1968
[33] Japan
[31] 43/69670

[54] MAGNETIC RECORDING MEDIUM

11 Claims, No Drawings

[52] U.S. Cl. .......... 117/235, 117/161 UF, 117/138.8 E
[51] Int. Cl. .......... H01f 10/02
[50] Field of Search .......... 117/235, 138.8 E, 161 UH

[56] References Cited

UNITED STATES PATENTS

| | | | |
|---|---|---|---|
| 2,931,740 | 4/1960 | Riboni | 117/235 X |
| 3,228,791 | 1/1966 | Armour et al. | 117/138.8 |
| 3,262,899 | 7/1966 | Armour et al. | 117/138.8 X |

*Primary Examiner*—William D. Martin
*Assistant Examiner*—Bernard D. Pianalto
*Attorney*—Sughrue, Rothwell, Mion, Zinn & Macpeak

ABSTRACT: A magnetic recording medium comprising a polypropylene film as a support and a magnetic layer of magnetic powders dispersed in chlorinated polypropylene as a binder.

MAGNETIC RECORDING MEDIUM

BACKGROUND OF THE INVENTION

1. Field of the Invention

The present invention relates to a magnetic recording medium and more particularly to a binder composition for magnetic recording mediums having a good adhesive property to a support when a polypropylene film is employed as the support and also having an excellent dispersing property for magnetic powders.

2. Description of the Prior Art

Hitherto, a magnetic recording medium such as a magnetic recording tape has been prepared by applying a dispersion of magnetic powders in a binder such as a vinyl chloride-vinyl acetate copolymer, butyl polyacrylate or methyl polymethacrylate to a support such as polyethylene terephthalate film, diacetyl cellulose film, triacetyl cellulose film or polyvinyl chloride film. Furthermore, as stretching techniques for high-molecular-weight compound films have recently progressed, polypropylene films, etc. are becoming very hopeful supports.

However, as polypropylene film is hydrophobic and also very nonpolar, the kind of binder used for the magnetic layer is very limited when such a material is employed as the support. For example, as binders generally used for the magnetic recording medium, there are thermoplastic resins such as a vinyl chloride-vinyl acetate copolymer, a polyacrylic acid ester, a cellulose derivative and a styrene-butadiene copolymer, and thermosetting resins such as an epoxy resin, an amino resin, and a polyurethane resin. However, in the case of employing a polypropylene film as the support for the magnetic recording medium, these binders for the magnetic recording layers are repelled by the support and hence the magnetic layers cannot be sufficiently adhered to the support even if various kinds of solvents are employed and the coating temperature is varied.

Therefore, various attempts have been reported wherein a nonpolar film such as polypropylene is subjected to surface treatment such as a corona discharge treatment or an oxidation treatment by treating with an oxidizing agent. Such techniques have various advantages, and such surface treatments are not generally practiced.

SUMMARY OF THE INVENTION

A magnetic recording medium comprising a polypropylene film as a support and magnetic layer of magnetic powders dispersed in chlorinated polypropylene as a binder.

DETAILED DESCRIPTION OF THE PREFERRED EMBODIMENTS

By the inventors' investigations, it has been discovered that binders such as a vinyl chloride-vinyl acetate copolymer, a polyacrylic acid ester, a copolymer thereof, a cellulose derivative, a styrene-butadiene copolymer, an epoxy resin, an amino resin, a polyurethane resin, and a mixture of two or more polymers are quite inferior in adhesivity to a polypropylene support, and they cannot be used as a magnetic binder in such a case.

The inventors have investigated various binders from the viewpoint of having good adhesivity to polypropylene film, and have found that a magnetic recording layer comprising chlorinated polypropylene as a binder with magnetic powder dispersed therein has a very good adhesivity to the polypropylene film, and also that the magnetic powders can be worked with good dispersibility in such a binder.

The chlorinated polypropylene used in the present invention is commercially available and is represented by the general formula $$-(C_3H_6-xCl_x)_n-$$

wherein $x$ is 0.27–2.60, preferably 0.29–0.77, and $n$ is a positive integer of 300–800, preferably 400–600.

The invention will now be explained more in detail by the following examples.

Example 1 tz

| | (by weight) |
|---|---|
| $Fe_2O_3$ powder | 300 parts |
| Chlorinated polypropylene (chlorine content 40 wt. %, x=0.77 in the above general formula) | 120 parts |
| Lecithin | 3 parts |
| Nonionic surface active agent "IONET" (Trade name, made by Sanyo Chemical Industries, Co., Ltd.) | 5 parts |
| Silicone oil | 0.3 part |
| Mixed solvent of methylisobutyl ketone and toluol (1:1 by wt.) | 530 parts. |

A mixture of the above ingredients for the binder composition was mixed in a ball mill, and after sufficiently dispersing the magnetic powders in the mixture to provide a dispersion for a magnetic layer, the dispersion was applied to a two-dimensionally stretched polypropylene film having a thickness of 25 microns to yield a dry thickness of 10 microns and dried. The wide magnetic recording tape thus prepared was sliced to a magnetic recording tape having an ordinary width and called sample 1.

EXAMPLE 2

The procedure of example 1 was followed with the exception of using $Fe_3O_4$ powders as the magnetic powders instead of $\gamma-Fe_2O_3$ powders, chlorinated polypropylene having a chlorine content of 30 weight percent ($x$=0.50) instead of the chlorinated polypropylene used in example 1, and a fluorocarbon oil instead of the silicone oil. This provided a magnetic recording tape called sample 2.

EXAMPLE 3

The procedure of example 1 was followed with the exception of using 300 parts of the magnetic powders of an iron-cobalt-copper alloy instead of $\gamma-Fe_2O_3$ powders and 100 parts of chlorinated polypropylene having a chlorine content of 28 weight percent ($x$=0.45 in the above general formula) instead of the chlorinated polypropylene in example 1. This provided a magnetic recording tape called sample 3.

EXAMPLE 4

The procedure of example 3 was followed with the exception of using 300 parts by weight of chromium dioxide instead of the magnetic powders of the iron-cobalt-copper alloy to provide a magnetic recording tape called sample 4.

EXAMPLE 5

| | |
|---|---|
| $\gamma-Fe_2O_3$ powders | 300 parts |
| Chlorinated polypropylene (chlorine content 30 wt. %; $x$=0.50 in the above general formula) | 50 parts |
| Lecithin | 3 parts |
| Surface active agent (same as in Example 1) | 5 parts |
| Fluorocarbon oil | 0.3 part |
| Mixed solvent of methylisobutyl ketone/toluol (1:1 by weight) | 550 parts |

The above ingredients for the binder composition were mixed in a ball mill and then the magnetic powders were uniformly dispersed in the mixture. The mixture was uniformly mixed with 30 parts by weight of butylated urea resin and 20 parts by weight of polyisocyanate "Desmodur L 75" (trade name of Bayer in West Germany) and the resulting mixture was applied to a stretched polypropylene film having a thickness of 25 microns to yield a dry thickness of 10 microns. This provided a magnetic recording tape called sample 5.

For samples 1–5 and Control samples A, B and C, the degree of adhesion between the magnetic layers and the support was measured. In order to investigate the dispersability or dispersing property of magnetic powders, *Br/Bm* was measured. *Br* is the residual magnetization and *Bm* is the saturation magnetization. The closer to 1 the value of *Br/Bm* approaches, the better the squareness of the characteristic curve (B-H) is.

In the control samples, the following dispersions were employed for the magnetic layer and the subbing compositions. The magnetic recording layer was coated to a dry thickness of 10 microns:

| Binder | Parts by Weight |
|---|---|
| Sample A | |
| $\gamma-Fe_2O_3$ | 300 |
| vinyl chloride (87 mol%) vinyl-acetate(13 mol%) copolymer (vinylite VYHH; trade name, made by Union Carbide Corp., in U.S.A.) | 125 |
| dibutylphthalate | 15 |
| Sanstat 1007 (surface active agent, trade name, made by Sano Chemical Industries, Ltd.) | 8 |
| lecithin | 5 |
| butyl acetate | 450 |
| toluene | 150 |
| Sample B | |
| $\gamma-Fe_2O_3$ | 300 |
| S-nyl (vinyl acetate powder, trade name, made by Sekisui Chemical Co.) | 120 |
| Sanstat 1007 | 10 |
| lecithin | 5 |
| daifulu oil DFO (low molecular weight polymer of trifluoro-chloroethylene, trade name, made by Daikin Co., oily, fluidity temperature: −10° −5° C.) | 6 |
| butylacetate | 450 |
| toluene | 150 |
| Sample C | |
| $\gamma-Fe_2O_3$ | 300 |
| nitrocellulose RS ½ | 70 |
| dibutyl phthalate | 20 |
| Sanstat No. 6 (surface active agent, trade name, made by Sanyo Chemical Industries, Ltd.) | 10 |
| lecithin | 8 |
| daifulu DFO | 5 |
| butylacetate | 450 |
| toluene | 150 |
| Subbing compositions | |
| Sample A | Acrylonitrile-butadiene copolymer. |
| Sample B | Vinylidene chloride-acrylonitrile copolymer. |
| Sample C | Amorphous polyester. |

The adhesivity of the magnetic layer is measured as follows: an adhesive cellophane tape was uniformly adhered to a magnetic layer of a magnetic recording tape and then the tape is stripped therefrom, with the percentage of the magnetic layer transferred to the adhesive tape being measured. The results are shown in the following table, in which the numerical value shows the area of the magnetic layer transferred. Obviously, the smaller value shows that the adhesivity of the magnetic layer to the polypropylene film support is better.

| | Control sample | | | Sample of the invention | | | | |
|---|---|---|---|---|---|---|---|---|
| | A | B | C | 1 | 2 | 3 | 4 | 5 |
| Transferred area, percent | 98 | 100 | 96 | 20 | 30 | 25 | 20 | 35 |
| Br/Bm | 0.69 | 0.70 | 0.71 | 0.75 | 0.76 | 0.70 | 0.81 | 0.75 |

From the above table, it is obvious that the samples of the present invention gave better results than the control samples.

The composition containing chlorinated polypropylene as a binder composition for magnetic recording medium employing a polypropylene film as a support is also excellent in its dispersing property for magnetic powders, in addition to its excellent adhesivity to the support.

In the above examples, $\gamma-Fe_2O_3$, $Fe_3O_4$, iron-cobalt-copper alloy, and chromium dioxide were employed as magnetic powders. Other magnetic powders such as barium ferrite powders, zinc ferrite powders, etc. may be also used and, as shown in example 5, chlorinated polypropylene can be used together with other resins having compatibility with the chlorinated polypropylene as a binder.

In the case of using a mixture of chlorinated polypropylene and a resin compatible with said polypropylene as a binder, the proportion of the resin compatible therewith depends on the kind of resin, but the maximum amount thereof is 30–50 percent by weight of the total binder. If the amount of the resin is more than 50 percent by weight, the adhesivity of the binder to polypropylene film is reduced.

As the resin used with the chlorinated polypropylene in the present invention, there are, e.g., a butylated urea resin, a phenol resin, a maleic acid resin, an epoxy resin, an acrylonitrile copolymer and an alkyd resin modified by acrylic acid.

The concentration of the resin compatible with the chlorinated polypropylene in the coating liquid is suitably 5–10 percent by weight.

As the solvent used for applying the binder to support there is used one which does not dissolve polypropylene film, for example, benzene, toluene, xylene, solvent naphtha, cyclohexanol, methyl acetate, ethyl acetate, and butyl acetate.

Finally, the polypropylene used in the present invention is most preferably biaxially, and the ratio of powder: binder is generally 300:70 to 150 parts by weight.

What is claimed is:

1. A magnetic recording medium comprising a polypropylene film support and a magnetic recording layer disposed thereon comprising magnetic powders dispersed in chlorinated polypropylene as a binder, said chlorinated polypropylene being represented by the formula $-(C_3H_{6-x}Cl_x)_n-$, wherein $x$ varies from 0.27 to 2.60 and $n$ is an integer of from 300 to 800.

2. The magnetic recording medium of claim 1 wherein the ratio by weight of said magnetic powders to said chlorinated polypropylene binder varies from 300:70 to 300:150.

3. The magnetic recording medium of claim 1 wherein said magnetic powders comprise at least one member selected from a group consisting of $\gamma-Fe_2O_3$, $Fe_3O_4$, chromium dioxide, iron-cobalt-copper alloy, barium ferrite powders and zinc ferrite powders.

4. The magnetic recording medium of claim 1 wherein $x$ varies from 0.29 to 0.77 and wherein $n$ is an integer of from 400 to 600.

5. A magnetic recording medium comprising a polypropylene film support and a magnetic recording layer disposed thereon comprising magnetic powders dispersed in a binder comprising at least 50 percent by weight chlorinated polypropylene and up to 50 percent by weight of a resin compatible with said chlorinated polypropylene, said chlorinated polypropylene being represented by the formula $-(C_3H_{6-x}Cl_x)_n-$, wherein $x$ varies from 0.27 to 2.60 and $n$ is an integer of from 300 to 800.

6. The magnetic recording medium of claim 5 wherein the weight ratio of said magnetic powders to said binder varies from 300:70 to 300:150.

7. The magnetic recording medium of claim 5 wherein said magnetic powders comprise at least one member selected from a group consisting of $\gamma-Fe_2O_3$, $Fe_3O_4$, iron-cobalt-copper alloy, chromium dioxide, barium ferrite powders and zinc ferrite powders.

8. The magnetic recording medium of claim 5 wherein $x$ varies from 0.29 to 0.77 and wherein $n$ is an integer of from 400 to 600.

9. The magnetic recording medium of claim 5 wherein said binder comprises from 70 to 50 percent by weight of said chlorinated polypropylene and from 30 to 50 percent by weight of said resin compatible with said chlorinated polypropylene.

10. The magnetic recording medium of claim 9 wherein said binder contains from 5 to 10 percent by weight of said resin compatible with said chlorinated polypropylene.

11. The magnetic recording medium of claim 5 wherein said resin compatible with said chlorinated polypropylene is a butylated urea resin, a phenol resin, a maleic acid resin, an epoxy resin, an acrylonitrile copolymer or an alkyd resin modified by acrylic acid.

* * * * *